(12) United States Patent
Ju et al.

(10) Patent No.: US 8,974,591 B2
(45) Date of Patent: Mar. 10, 2015

(54) HEAT-RESISTANT STRUCTURAL WOOD ADHESIVE COMPOSITIONS INVOLVING PMDI, POLYOL AND AROMATIC POLYOLS

(75) Inventors: Jinlan Ju, Quebec (CA); Martin Feng, Vancouver (CA); Xiang-Ming Wang, Quebec (CA)

(73) Assignee: FPInnovations, Pointe-Claire (CA)

( * ) Notice: Subject to any disclaimer, the term of this patent is extended or adjusted under 35 U.S.C. 154(b) by 0 days.

(21) Appl. No.: 13/635,124

(22) PCT Filed: Mar. 10, 2011

(86) PCT No.: PCT/CA2011/000265
§ 371 (c)(1),
(2), (4) Date: Sep. 14, 2012

(87) PCT Pub. No.: WO2011/113137
PCT Pub. Date: Sep. 22, 2011

(65) Prior Publication Data
US 2013/0012656 A1    Jan. 10, 2013

Related U.S. Application Data

(60) Provisional application No. 61/314,201, filed on Mar. 16, 2010.

(51) Int. Cl.
*C09J 175/08*    (2006.01)
(52) U.S. Cl.
USPC .............. 106/287.26; 528/60; 528/72; 528/85
(58) Field of Classification Search
CPC ................................ C09J 175/06; C09J 175/08
USPC ............................. 106/287.26; 528/60, 72, 85
See application file for complete search history.

(56) References Cited

U.S. PATENT DOCUMENTS

| | | |
|---|---|---|
| 3,639,543 A | 2/1972 | Newton et al. |
| 7,390,839 B2 | 6/2008 | Phillips et al. |

(Continued)

FOREIGN PATENT DOCUMENTS

| | | |
|---|---|---|
| GB | 1059507 | 2/1967 |
| GB | 1406610 | 9/1975 |

(Continued)

OTHER PUBLICATIONS

ISR of corresponding International application PCT/CA2011/000265.

*Primary Examiner* — John Uselding
(74) *Attorney, Agent, or Firm* — Norton Rose Fulbright Canada LLP

(57) ABSTRACT

This invention describes an adhesive composition that forms the basis of a heat-resistant, fire resistant, and water resistant polyurethane adhesive suitable for applications in the manufacture of wood products, and the method of making the adhesive. The wood finger-jointed studs produced using an adhesive derived from this invention can meet or exceed the fire rating of a period of 60 minutes according to ASTM E 119 and ASTM D 7374. The heat resistance of the adhesive is a result of incorporating thermally stable aromatic polyol molecules into the polymeric structures of the wood adhesive system, which is composed of the reaction products of a poly(methylene diphenyl diisocyanate), at least one of a polyether polyol and a polyester polyol; and the aromatic polyol that is a hydroxyl phenol in a preferred embodiment. Furthermore, this novel wood adhesive system possesses high water-resistance, making it suitable for the manufacture of highly durable engineered wood products. It is fast moisture-curable at ambient temperatures. It is also formaldehyde-free.

5 Claims, 1 Drawing Sheet

(56) References Cited

U.S. PATENT DOCUMENTS

| | | | |
|---|---|---|---|
| 2002/0077413 A1* | 6/2002 | Kitada et al. | 524/590 |
| 2007/0110979 A1 | 5/2007 | Clark et al. | |
| 2007/0155859 A1* | 7/2007 | Song et al. | 523/218 |
| 2007/0293596 A1 | 12/2007 | Reim et al. | |
| 2008/0171231 A1 | 7/2008 | Lopez et al. | |

FOREIGN PATENT DOCUMENTS

| | | | | |
|---|---|---|---|---|
| JP | 56099220 | | 8/1981 | |
| WO | WO 98/33845 | * | 8/1998 | C08J 3/00 |

* cited by examiner

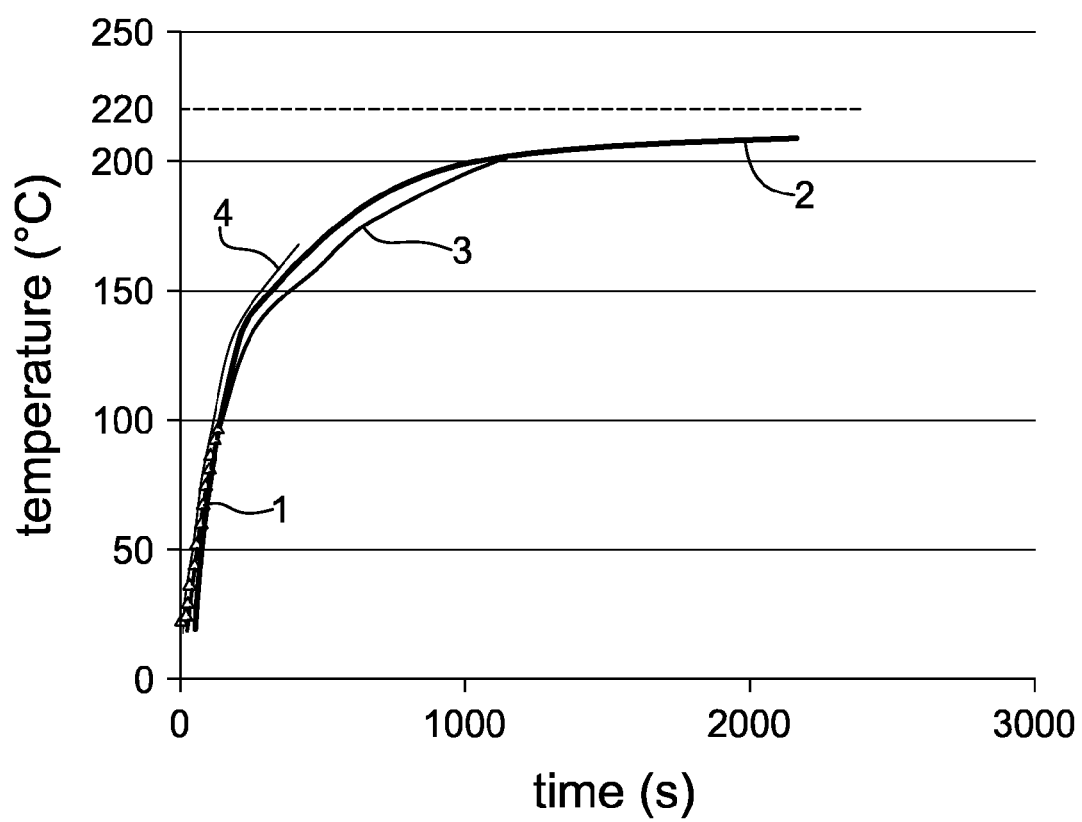

HEAT-RESISTANT STRUCTURAL WOOD ADHESIVE COMPOSITIONS INVOLVING PMDI, POLYOL AND AROMATIC POLYOLS

CROSS-REFERENCE TO RELATED APPLICATIONS

This application is a National entry of PCT/CA2011/000265 filed Mar. 10, 2011, in which the United States of America was designated and elected, and which remains pending in the International phase until Sep. 16, 2012, which application in turn claims priority under 35 USC 119(e) from US Provisional Application Ser. No. 61/314,201, filed Mar. 16, 2010.

FIELD OF THE INVENTION

This invention relates to a novel adhesive composition and a method of making to a heat-resistant wood adhesive, where in a preferred embodiment the adhesive is one-component adhesive system that is polyurethane-based.

BACKGROUND ART

Engineered wood products (EWP) have been an important part of many building systems. Wood adhesives are an essential component of any engineered wood product, the fire performance of which has been a prominent issue and needs to be improved.

It is well known that large dimension wood sections have an inherent resistance to fire. Wood burns slowly at approximately 0.6 mm/minute under standard fire test conditions. The char created on the wood surface during burning helps protect and insulate unburned wood below the charred lay. The unburned portion of a thick lumber retains 85 to 90% of its strength.

However, if the adhesive inside an engineered wood product (EWP) is softened, decomposed and burnt at elevated temperatures during a fire, the wood product structure would fail even if the integrity of the wood sections remain relatively intact. The fire-safety of a wood adhesive depends on its ability to resist high temperatures and to retain its strength during a fire.

Polyurethane (PUR) is one of the most common wood adhesives with desirable characteristics such as light colour, formaldehyde-free, and fast curing. However, this type of adhesive is vulnerable in a fire situation and will quickly lose its strength due to softening. It is therefore necessary to develop a technology to manufacture PUR wood adhesives that are both heat and fire safe in order to meet the needs for high performance structural wood adhesives.

Published US Patent Application No. 2006/0283548 A1 improved the heat-resistance of one-component and moisture-activated polyisocyanate-based wood adhesives. One adhesive was formulated using a polymeric MDI, a tertiary-amine-containing polyol, a polyoxyethylene diol and a catalyst. In another adhesive, the polyoxyethylene diol was replaced with a polybutadiene-back-bone diol and the other components kept in the same. The bond strengths of the specimens were measured under ambient conditions in two states: the "as-received" state, and the "exposed" state, where the specimen was exposed to a temperature of 450 F (232° C.) for a period of 1 hour before testing. The ratio of the "exposed" bond strength to the "as-received" bond strength was defined as the "% retention" of bond strength, which was employed to indicate the heat-resistance. Higher % retention means higher heat-resistance. Because polybutadiene-backbone diol could polymerize between the butadiene groups to increase crosslinking degree, the heat-resistance of the adhesive synthesised by using polybutadiene-back-bone was significantly higher than the one without butadiene groups, as indicated by the increase in the "% retention" of bond strength.

Prior to 2008, there were no explicit heat-resistance requirements for structural wood adhesives. Only limited work has been reported for improving the fire-retardancy of wood adhesives, especially polyurethane-based adhesives. For example, published US Patent Application No. 2008/0171231 A1 disclosed that an aqueous fire-retardant adhesive, being used for wood composites, composed of flame-retardant, a preservative composition, a casein liquid modified melamine resin adhesive, and a monomeric-polymeric ethylene diphenyl diisocyanate catalyst.

In the prior art, fire-retardant polyurethane foams have been studied very extensively. Among the halogen-free fire-retardants (FR), phosphorus based FRs are most effective, while the other FRs have some advantages as well. For instance, U.S. Pat. No. 7,390,839 B2 disclosed that the flame retardancy of polyurethane foam could be improved with adding a fire-retardant of phosphorus-containing polyol. However, the flame retardancy of polyurethane adhesives has not been well established.

SUMMARY

The present invention relates to structural wood adhesives under high stress loading at elevated temperatures that also have improved water resistance.

It is therefore an aim of the present invention to provide an adhesive with good resistance to heat, fire, and water.

Therefore, in accordance with one aspect of the present invention, there is provided a fire and heat resistant polyurethane adhesive composition comprising: a polymeric diphenylmethane diisocyanate component; at least one of a polyether polyol and a polyester polyol; and an aromatic polyol.

In accordance with another aspect of the present invention, there is provided the composition described herein, wherein the aromatic polyol includes aromatic diol.

In accordance with yet another aspect of the present invention, there is provided the composition described herein, wherein the aromatic diol is hydroxyl phenol is selected from the group consisting of resorcinol, catechol, hydroquinone and combinations thereof.

In accordance with still another aspect of the present invention, there is provided the composition described herein, further comprising a phosphorous-containing polyol.

In accordance with yet still another aspect of the present invention, there is provided the composition described herein, wherein a wood finger joint produced using an adhesive derived from the composition withstands failure for over 1000 seconds and to a temperature above 200° C. according to a Scaled Temperature Tension Test (STTT).

In accordance with a further aspect of the present invention, there is provided the composition described herein, wherein a wood finger joint produced using an adhesive derived from the composition withstands at least 23 MPa pressure after a boil-dry-boil cycle according to ASTM D5572.

In accordance with a further aspect of the present invention, there is provided the composition described herein, wherein the wood finger jointed studs produced using an adhesive derived from the composition can meet or exceed the fire rating of a period of 60 minutes according to ASTM E 119 (Standard Test Methods for Fire Tests of Building Construction and Materials) and ASTM D 7374. (Standard Practice for Evaluating Elevated Temperature Performance of Adhesives Used in End-jointed Lumber".

In accordance with yet a further aspect of the present invention there is provided a method of making a fire resistant and water resistant polyurethane adhesive comprising; mixing a polymeric diphenylmethane diisocyanate component; at least one of a polyether polyol and a polyester polyol; and an aromatic polyol in a solvent and under an inert atmosphere, to obtain an adhesive composition; and heating the composition under an inert atmosphere to produce the adhesive.

In accordance with still a further aspect of the present invention, there is provided the method described herein, wherein heating the composition is between 40 and 70° C.

In accordance with yet still a further aspect of the present invention, there is provided the method described herein, wherein the aromatic polyol is a hydroxyl phenol selected from the group consisting of resorcinol, catechol, hydroquinone and combinations thereof.

In accordance with one embodiment of the present invention, there is provided the method described herein, further comprising adding a phosphorous-containing polyol to the reaction mixture before heating.

In accordance with another embodiment of the present invention, there is provided the method described herein, further comprising: cooling the adhesive; and storing the adhesive in a sealed container.

In accordance with yet another embodiment of the present invention there is provided a method of making a polyurethane adhesive wherein the improvement comprises adding an aromatic polyol to a reaction mixture to produce a more fire resistant and more heat resistant polyurethane adhesive.

In accordance with still another embodiment of the present invention, there is provided the method described herein, wherein the aromatic polyol is a hydroxyl phenol.

In accordance with yet still another embodiment of the present invention, there is provided the method described herein, wherein the hydroxyl phenol is selected from the group consisting of resorcinol, catechol, hydroquinone and combinations thereof.

In accordance with a further embodiment of the present invention, there is provided the method described herein, further comprising adding a phosphorous-containing polyol to the reaction mixture.

In accordance with yet a further embodiment of the present invention there is provided a polyurethane adhesive comprising a polyurethane backbone wherein the improvement is an aromatic polyol, including aromatic diol, incorporated into the polyurethane backbone that imparts fire and heat resistance properties to the adhesive.

BRIEF DESCRIPTION OF THE DRAWING

Reference will now be made to the accompanying drawings, showing by way of illustration particular embodiments of the present invention and in which:

FIG. 1 is a comparative "Scaled Temperature Tension Test" of polyurethane adhesives of the prior art and embodiments of present invention graphed in terms of temperature v. time.

DETAILED DESCRIPTION OF PARTICULAR EMBODIMENTS

The adhesive composition required to produce the novel heat-resistant polyurethane adhesive can be obtained by incorporation of thermally stable aromatic structures into the polyurethane polymeric skeleton.

In one embodiment of the present invention the raw material composition includes, an aromatic diol that is reacted into polyurethane chains to increase heat-resistance of the polymeric structures. The aromatic diol in a preferred embodiment includes a phenyl, diphenyl, naphthyl, anthracyl, phenanthrenyl, and combinations thereof having two substituted —OH groups around the aromatic ring. In a particularly preferred embodiment, the aromatic polyol is an aromatic diol, preferably a hydroxyl phenol that includes: a resorcinol, its isomer, catechol, hydroquinone, and combinations thereof.

In addition, a phosphorous-containing polyol can optionally be used as reactive flame-retardant to provide the glue line with flame-retardant property. An auxiliary flame-retardant may also be used, that includes but is not limited to a boron compound, in a preferred embodiment the boron compound is either zinc borate or manganese borate.

The adhesive composition further comprises a polymeric methylene diphenyl diisocyanate (pMDI) component, that is represented by formula A,

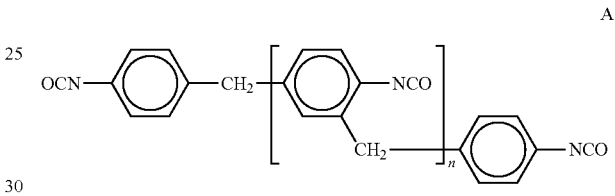

where in the pMDI component, n is less than or equal to 10, where in a preferred embodiment n is less than or equal to 5. pMDI may include: three isomers of diphenylmethane diisocyanate (MDI): 4,4'-MDI, 2,4'-MDI, 2,2'-MDI, and each of their oligomers of functionality three and higher (n=3 to 10) alone or in combination.

The adhesive composition also includes at least one of a polyether polyol and/or a polyester polyol. In a preferred embodiment the polyol is typically polyethylene glycol (PEG). PEG is defined as any one of a family of oligomers and polymers having a molecular mass less than 100,000 g/mol, preferably 300 g/mol to 1000 g/mol, where the oligomers and polymers of PEG may be used alone or combination with others. However, PEG can be prepared through polymerization of ethylene oxide that are commercially available, and can include a wide range of molecular weights from 300 g/mol to 10,000,000 g/mol.

To test structural wood adhesives under high stress loading at elevated temperatures, the inventors developed a test approach entitled Scaled Temperature Tension Test or STTT. The STTT method evaluates the heat resistance of an adhesive for use in finger jointed lumber and is a modified ASTM D4688 method conducted at a temperature of 220° C. The test specimen of a finger joint is fabricated by adhering two pieces of wood finger joints with an adhesive according to ASTM D4688, the American "Standard Test Method for Evaluating Structural Adhesives for Finger Jointing Lumber". During the testing, the finger-jointed specimen is subjected to a tensile loading of 10 MPa and a temperature of 220° C. in an oven. The curve of temperature of the glueline of a specimen vs. time is plotted and the sample-failure point is illustrated by the time-to-failure (tf) and temperature-to-failure (TF). It is believed that this small scale tension test method can mimic the high temperature conditions surrounding the wood finger joint structures in a fire situation. Thus, the heat-resistance of an adhesive can be evaluated using this "small scale tension test" method. The longer tf and higher TF are associated with higher heat-resistance of an adhesive during a fire.

Adhesive Composition

The heat-resistant wood adhesives derive from an adhesive composition of following components (A), (B), (C) and optionally (D).

(A): A polymeric MDI product
(B): Polyether diol, for example: polyethylene glycol with a molecular weight of 400 g/mol;
(C): an aromatic diol, such as, a hydroxyl phenol such as, resorcinol or catechol or hydroquinone or mixtures thereof; and
optionally (D): a phosphorous-containing polyol flame retardant (FR), such products are commercially available.

In a preferred embodiment of the urethane adhesive produced from the composition of components (A), (B), and (C), and optionally (D) incorporate the aromatic diol into the urethane backbone and may have the following structure although many other adhesive structures including multiple inclusions of the aromatic diol into the urethane backbone can be envisaged. One embodiment of a polyurethane backbone is illustrated by the bold line in the following structure I. The heat resistance is likely a result of incorporating a hard and thermally stable aromatic ring from the aromatic diol molecule into the polymeric structures of the wood adhesive system.

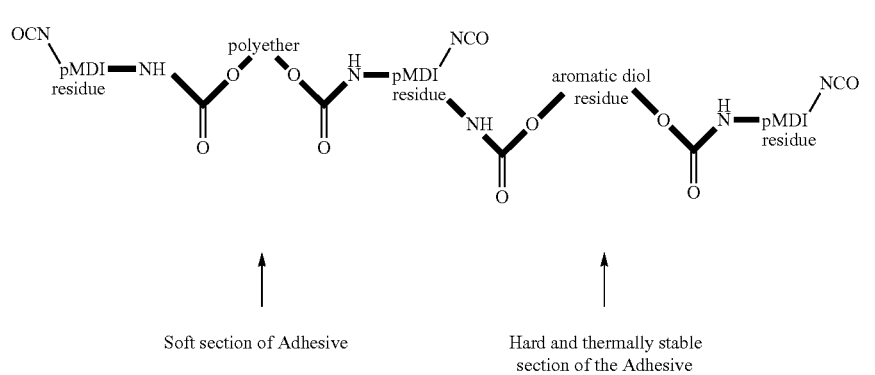

Soft section of Adhesive    Hard and thermally stable section of the Adhesive

The aromatic diol residue appears to be the component of the adhesive that imparts structural strength and greater heat resistance to the adhesive. The incorporation of the aromatic diol into the urethane chemical backbone may occur at one or multiple points within the backbone.

It should be noted and appreciated that the present composition is free of formaldehyde, is single-component adhesive system that is polyurethane-based. The composition produces an adhesive that is fast moisture-curable at ambient temperatures, although higher temperatures between 40 to 70° C. may also be used.

Examples of Adhesive Synthesis
Formulation 1—Control polyurethane adhesive 300 g MDI, 140 g polyethylene glycol (MW400) & 40 g acetone are mixed under a dry nitrogen atmosphere for 30 minutes to obtain a homogeneous liquid mixture. This mixture is then heated to 60° C. and reacts at 60~70° C. for 2 hours under dry nitrogen gas. After cooling, the mixture is sealed and stored for use.

Formulation 2—Resorcinol Modified PUR Adhesive:

300 g MDI, 60 g polyethylene glycol with MW=400, 8.9 g resorcinol, and 40 g acetone were mixed under a blanket of nitrogen in a reaction kettle. This mixture was reacted for 2 hours at a temperature between 40 to 70° C. under dry nitrogen gas. After cooling, the mixture was sealed and stored for preparing finger joints. To achieve better application performance for finger-jointing, 21 g of sodium aluminum silicate filler was added to the adhesive resin and mixed thoroughly right before gluing.

Formulation 3—Fire-Retardant Resorcinol Modified PUR Adhesive:

300 g MDI, 72 g polyethylene glycol with MW=400, 13.2 g resorcinol, 5 g phosphorous-containing polyol flame retardant (FR) and 40 g acetone were mixed under a blanket of nitrogen in a reaction kettle. This mixture was reacted for 2 hours at a temperature between 40 and 70° C. under dry nitrogen gas. After cooling, the mixture was sealed and stored before preparing finger joints.

Test Results:

1. Heat-Resistance of Commercial Adhesives

The heat-resistance of several commercial adhesives was evaluated using the "STTT" method and the results are listed in Table 1 and illustrated in FIG. 1.

In Table 1, the solvent-based PUR-A (not illustrated in FIG. 1) is a standard commercial polyurethane wood adhesive. Line 4 in FIG. 1 represents the FR-PUR-A is the best commercial corresponding flame-retardant adhesive of PUR-A. The solvent-based PUR-A is more heat-resistant than the water-borne PUR-B adhesive (not illustrated in FIG. 1), as indicated by the significant difference of their failure points. Furthermore, the flame-retardant PUR adhesive (FR-PUR-A) is the most heat-resistant and failed at 166° C. However, this value is still far from 220° C. Thus it can be concluded that the conventional commercial polyurethane adhesives were not able to survive at the elevated temperature, which is required for a fire-safe adhesive.

TABLE 1

Failure point of various commercial wood adhesives tested at 220° C. under 1000 psi tensile loading

| Adhesive name | Main polymer | Solvent or dispersion media | Temperature-to-failure (° C.) | Time-to-failure (s) |
| --- | --- | --- | --- | --- |
| PUR-A | polyurethane | NMP | 141.6 | 290 |
| FR-PUR-A | polyurethane | NMP | 166 | 641 |
| PUR-B | polyurethane | water | 36 | 34 |

2. Heat-Resistant Polyurethane Adhesives

The adhesives prepared with the above formulations were evaluated with the "STTT" and compared with the best commercial PUR wood adhesive, i.e. FR-PUR-A, as shown in FIG. 1.

The control sample (formulation 1) represented by the triangular points connected that produce line 1 in FIG. 1 is synthesized with only p-MDI and PEG-400 failed at 100° C. after heated for 145 s (as illustrated in FIG. 1 with light triangles), which is much lower than the best commercial product (line 4). However, resorcinol can significantly enhance the heat-resistance of the polyurethane adhesives, as indicated by the large increase in the failure point of the finger joint glue line. The resorcinol modified polyurethane (formulation 2) represented by line 2 in FIG. 1 can survive until 209° C., 2160 s (36 min).

To improve the fire-resistance, phosphorous FR was added into the resorcinol modified PUR (formulation 3) (represented by line 3 in FIG. 1). The failure point dropped to 199° C. and 1030 s (17.2 min), probably due to the disturbance of cross-linking of molecular chains by the flame retardant.

FIG. 1 illustrates the failure point of PUR glue line formed with the different adhesives. FIG. 1 illustrates the performance of the three adhesive formulations described herein, as well as the performance of the best polyurethane adhesive line 4, FR-PUR-A, at increasing temperature with time, and according to the adhesive test method for testing adhesives used for wood finger joints, particularly ASTM D 4688. FIG. 1 illustrates that all the adhesives follow roughly the same slope between 25 and 100° C. Table 2 clearly indicates that the modified polyurethanes with an aromatic diol have the best performance.

In a finger-jointed wood specimen, made with formulation 2 adhesive system stayed intact for half an hour at 209° C. under 10 MPa tensile loading, this represents a substantial improvement over the heat performance of commercial polyurethane wood adhesives. The wood finger-jointed studs bonded with an adhesive derived from formulation 2 can meet or exceed the fire rating of 60 minutes according to ASTM E 119 and ASTM D 7374.

The wet strength of the adhesives have also been measured after boil-dry-boil treatment. The wet strength of the wood finger joint prepared is 25~30 MPa, and therefore much higher than what is required by the ASTM D5572 (11 Mpa) and the control sample. Therefore as seen in Table 2, a wood finger joint produced using an adhesive derived from the composition withstands at least 23 MPa pressure according to ASTM D5572.

TABLE 2

Properties of the various adhesives

| Adhesive Formulations | Modifier | Failure Point of Small Scale Tension Test | | Wet Strength of Finger |
|---|---|---|---|---|
| | | Temperature-to-Failure (° C.) | Time-to-Failure (sec.) | Joint (boil-dry-boil) (MPa) |
| FR-PUR-A | N/A | 166 | 641 | 21.78 |
| Formulation 1 | N/A | 104 | 160 | 14.04 |
| Formulation 2 | Resorcinol | 209 | 2160 | 27.89 |
| Formulation 3 | Resorcinol and Phosphorous FR | 199 | 1030 | 23.70 |

The embodiments of the invention described above are intended to be exemplary. Those skilled in the art will therefore appreciate that the foregoing description is illustrative only, and that various alternate configurations and modifications can be devised without departing from the spirit of the present invention. Accordingly, the present invention is intended to embrace all such alternate configurations, modifications and variances which fall within the scope of the appended claims.

The invention claimed is:

1. A fire and water resistant polyurethane adhesive composition comprising:
   a polymeric diphenylmethane diisocyanate component wherein the polymeric diphenylmethane diisocyanate component has the formula A;

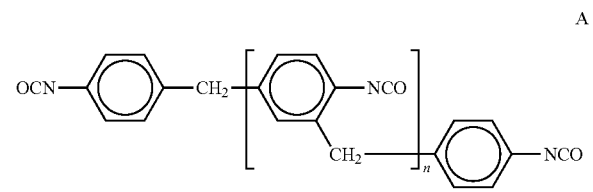

and n less than or equal to 5;
   at least one of a polyether polyol and a polyester polyol, wherein the polyester polyol and the polyester polyol have a molecular weight from 300 g/mol to 1000 g/mol,
   an aromatic polyol including an aromatic diol,
   wherein the aromatic diol is hydroxyl phenol is selected from the group consisting of resorcinol, catechol, hydroquinone and combinations thereof, and wherein the aromatic diol is in a concentration from 2.2 to 3.1% by weight of the total composition.

2. The composition according to claim 1, further comprising a phosphorous-containing polyol.

3. The composition according to claim 1, wherein a wood finger joint produced using an adhesive derived from the composition withstands failure for over 1000 seconds and to a temperature above 200° C. according to a Scaled Temperature Tension Test.

4. The composition according to claim 1, wherein a wood finger joint produced using an adhesive derived from the composition withstands at least 23 MPa pressure after a boil-dry-boil treatment according to ASTM D5572.

5. The composition according to claim 1, wherein the wood finger-jointed studs produced using an adhesive derived from the composition can meet or exceed the fire rating of a period of 60 minutes according to ASTM E 119 and ASTM D 7374.

* * * * *